(12) United States Patent
Okada et al.

(10) Patent No.: US 7,472,910 B1
(45) Date of Patent: Jan. 6, 2009

(54) ANIMATION DISPLAY APPARATUS, ARCADE GAME MACHINE, CONTROL METHOD AND APPARATUS THEREOF, AND STORAGE MEDIUM

(75) Inventors: Masao Okada, Soka (JP); Katsuhiko Kondo, Funabashi (JP); Isao Maruoka, Chiba (JP); Akihiro Yokota, Tokyo (JP)

(73) Assignees: Canon Kabushiki Kaisha, Tokyo (JP); Canon Aptex Kabushiki Kaisha, Ibaraki (JP); Tacmi Co., Ltd., Tokyo (JP)

( * ) Notice: Subject to any disclaimer, the term of this patent is extended or adjusted under 35 U.S.C. 154(b) by 0 days.

(21) Appl. No.: 09/537,288

(22) Filed: Mar. 29, 2000

(30) Foreign Application Priority Data

Mar. 30, 1999 (JP) ................................. 11-089716
Mar. 30, 1999 (JP) ................................. 11-089717

(51) Int. Cl.
*A63F 9/22* (2006.01)
*G06K 15/00* (2006.01)
(52) U.S. Cl. ........................ 273/438; 395/106; 395/117; 358/1.15; 358/1.9; 700/233; 700/235
(58) Field of Classification Search ..................... 463/1, 463/30–33, 36, 43; 434/100, 377, 105; 700/233; 705/25; 707/14; 395/117; 364/479
See application file for complete search history.

(56) References Cited

U.S. PATENT DOCUMENTS

| | | | | |
|---|---|---|---|---|
| 4,954,818 A | * | 9/1990 | Nakane et al. .............. 715/790 |
| 5,384,912 A | * | 1/1995 | Ogrinc et al. ............... 345/501 |
| 5,405,152 A | * | 4/1995 | Katanics et al. ................ 463/2 |
| 5,478,120 A | * | 12/1995 | D'Andrea ................... 283/117 |
| 5,487,010 A | * | 1/1996 | Drake et al. ................ 700/233 |
| 5,494,445 A | * | 2/1996 | Sekiguchi et al. ........... 434/365 |
| 5,577,179 A | * | 11/1996 | Zenno et al. ................. 375/373 |
| 5,615,123 A | * | 3/1997 | Davidson et al. ............ 700/233 |
| 5,623,581 A | * | 4/1997 | Attenberg .................... 358/1.6 |
| 5,695,346 A | * | 12/1997 | Sekiguchi et al. ........... 434/365 |
| 5,897,220 A | * | 4/1999 | Huang et al. ................... 396/2 |
| 5,913,019 A | * | 6/1999 | Attenberg ................... 358/1.18 |
| 5,920,687 A | * | 7/1999 | Winner et al. ............... 345/422 |
| 5,930,810 A | * | 7/1999 | Farros et al. ................ 715/506 |

(Continued)

FOREIGN PATENT DOCUMENTS

JP     07334701 A  *  12/1995

(Continued)

OTHER PUBLICATIONS

Internet download "welcome to the world of Senja-Cards".*

*Primary Examiner*—Robert E. Pezzuto
*Assistant Examiner*—Paul A. D'Agostino
(74) *Attorney, Agent, or Firm*—Fitzpatrick, Cella, Harper & Scinto

(57) ABSTRACT

The present invention enables relatively easy animation display without requiring a special resource, and facilitates easy generation of the animation. When an image to be displayed as animation is constructed with a background, leg, body and head, these images are distributed as a layer. For each layer, a timing schedule is set with attribute data which includes display update timing and display effects. According to the schedule, display for each layer is updated at the scheduled timing.

10 Claims, 14 Drawing Sheets

U.S. PATENT DOCUMENTS

| | | | | |
|---|---|---|---|---|
| 6,008,820 A | * | 12/1999 | Chauvin et al. | 345/502 |
| 6,065,969 A | * | 5/2000 | Rifkin et al. | 434/100 |
| 6,071,671 A | * | 6/2000 | Glushko et al. | 430/270.15 |
| 6,085,195 A | * | 7/2000 | Hoyt et al. | 707/10 |
| 6,116,906 A | * | 9/2000 | Rifkin | 434/100 |
| 6,121,960 A | * | 9/2000 | Carroll et al. | 345/173 |
| 6,310,627 B1 | * | 10/2001 | Sakaguchi | 345/630 |
| 6,353,772 B1 | * | 3/2002 | Silverbrook | 700/233 |
| 6,369,908 B1 | * | 4/2002 | Frey et al. | 358/1.15 |
| 6,452,583 B1 | * | 9/2002 | Takeuchi et al. | 345/108 |
| 6,470,232 B2 | * | 10/2002 | Parry | 700/233 |
| 6,571,211 B1 | * | 5/2003 | Dwyer et al. | 704/270 |
| 6,684,188 B1 | * | 1/2004 | Mitchell et al. | 705/3 |
| 6,839,755 B1 | * | 1/2005 | Kumpf et al. | 709/225 |
| 2002/0018070 A1 | * | 2/2002 | Lanier | 345/629 |

FOREIGN PATENT DOCUMENTS

| | | | |
|---|---|---|---|
| JP | 10-055489 | * | 2/1998 |

* cited by examiner

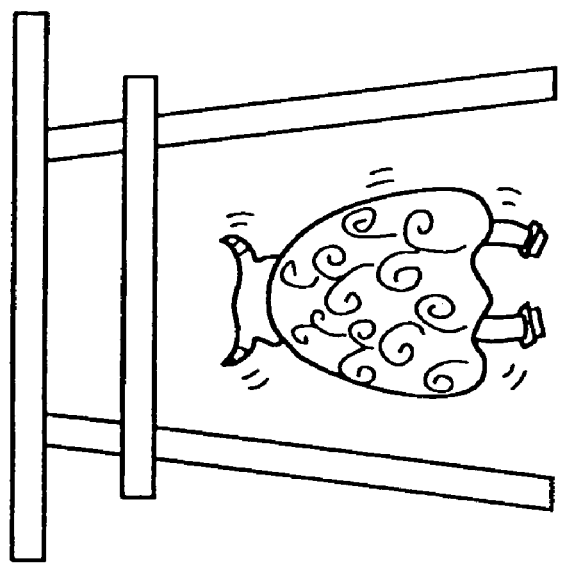
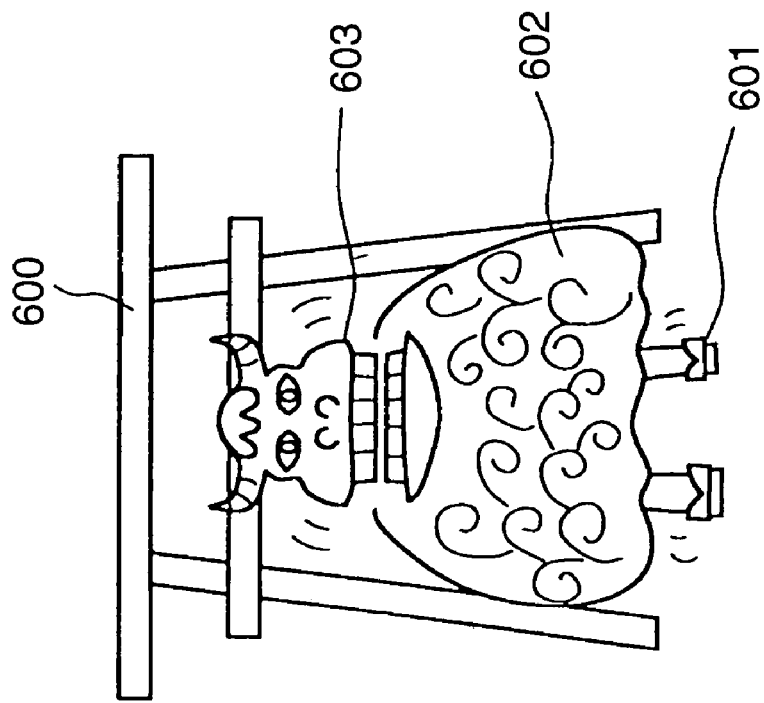

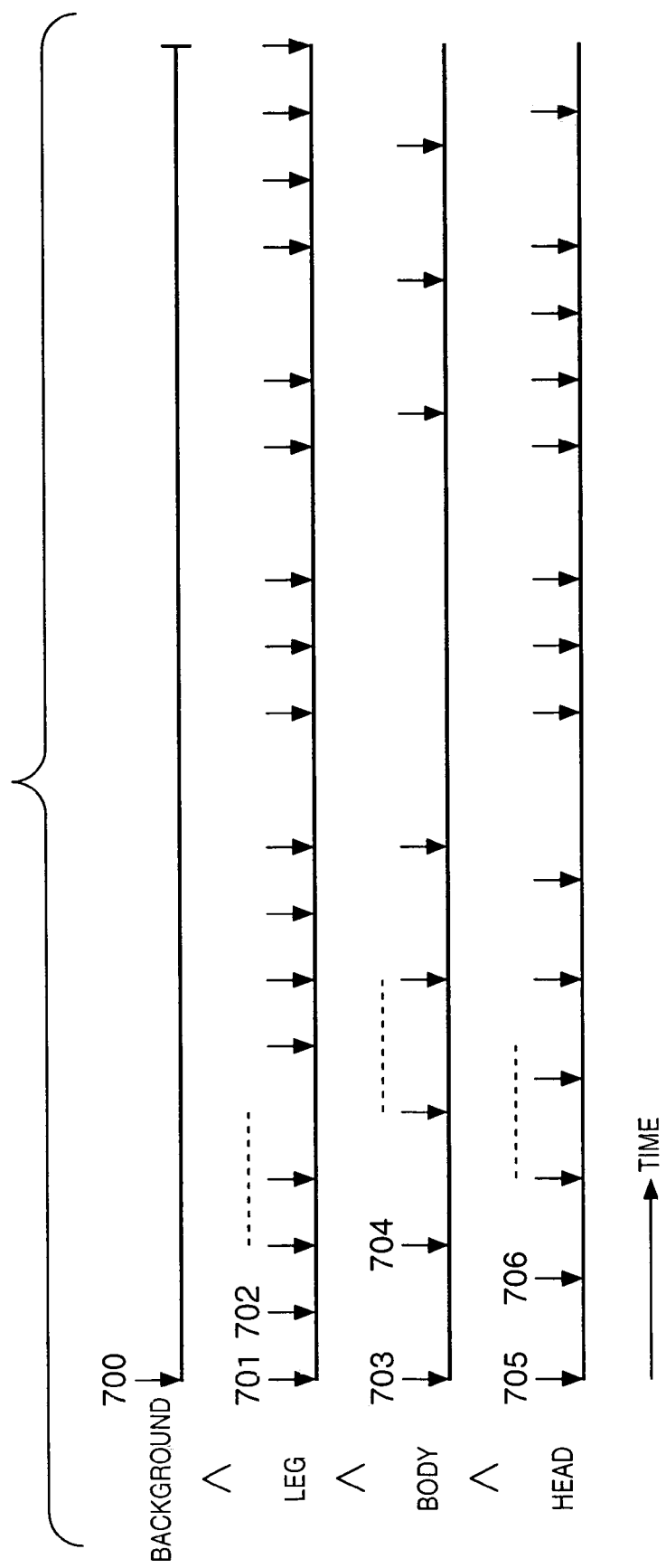

FIG. 12
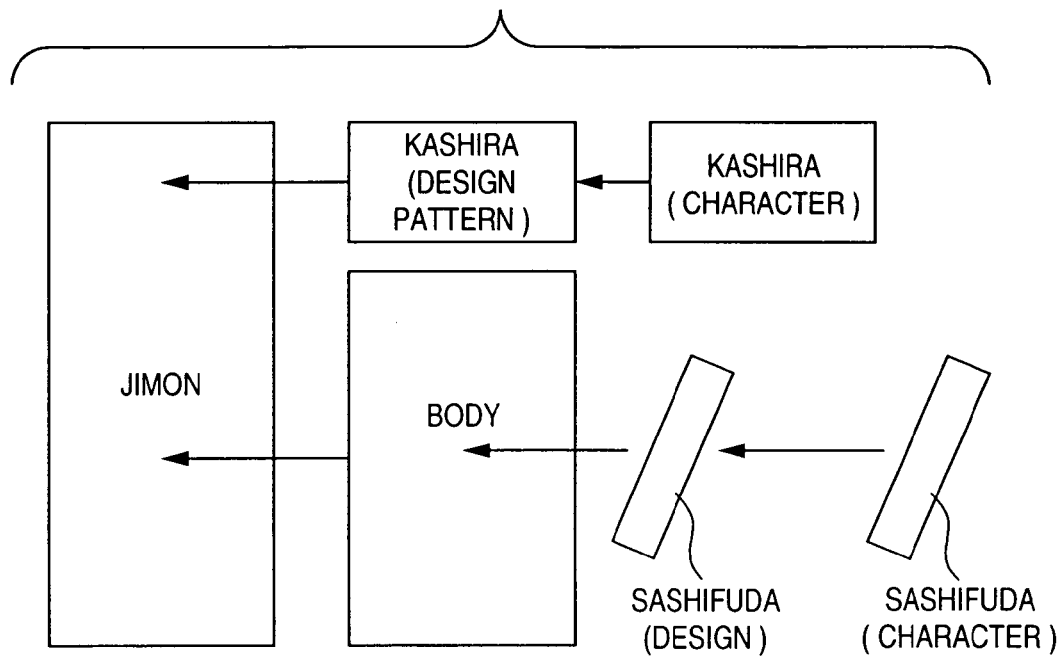
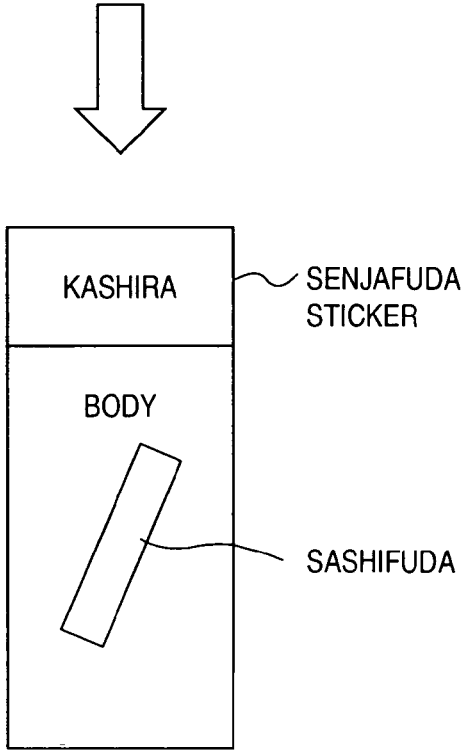

ANIMATION DISPLAY APPARATUS, ARCADE GAME MACHINE, CONTROL METHOD AND APPARATUS THEREOF, AND STORAGE MEDIUM

FIELD OF THE INVENTION

The present invention relates to an animation display apparatus, arcade game machine, control method and apparatus thereof, and storage medium.

BACKGROUND OF THE INVENTION

An amusement arcade (game center) provides arcade game machines or apparatuses (hereinafter simply referred to as a game machine), which can print and output user's original stickers by photographing a self-portrait of the user with a built-in camera and framing the portrait with a desired modifiable frame. Each of these game machines comprises dedicated hardware.

In order to attract a user during non-operating period of a game machine, game machines of this type display various animation (moving images) on the display screen for a demonstration.

For instance, in a case of a shooting game, the game machine may display a sample of the shooting game for the demonstration. Therefore, special hardware does not need to be added to such game machines.

However, in a case of a game machine which mainly prints stickers, an additional function, which is different from printing stickers, is necessary to display such demonstration. This causes an increase in cost of the game machine. For instance, in order to display animation, images must be stored frame by frame. Thus, in order to store an extremely large amount of data, a large memory capacity is required. Furthermore, generating such animation requires extremely time consuming operation.

Moreover, although a conventional game machine of this type has a simple construction for photographing an image with a built-in camera, synthesizing the photographed image with an appropriate frame, and printing the image, the game machine comprises dedicated hardware. Therefore, manufacturing the game machine requires a high cost.

Furthermore, because of the simplicity of the operation, the game machine is unable to print varieties of stickers desired by users. For instance, a user cannot input or select arbitrary character strings, e.g., user's name or the like, to be combined together and printed.

In a case where a user can select or input various character strings, the operation of the game machine tends to become complicated. Furthermore, in such case, the game machine must be designed so that a user can easily change contents of the inputted setting after or in the middle of input operation.

SUMMARY OF THE INVENTION

The present invention has been proposed to solve the conventional problems, and has as its object to provide an animation display apparatus, arcade game machine, control method and apparatus thereof, and storage medium, which enable relatively easy animation display without requiring a special resource and which enable easy generation of the animation.

Furthermore, the present invention provides a method, apparatus and storage medium for quickly starting the animation display.

In order to solve the above-described problems and attain the foregoing objects, an animation display apparatus according to the present invention has the following configuration.

More specifically, the present invention provides an animation display apparatus for combining a plurality of image parts and displaying animation, comprising: image storage means for storing the image parts; processor means for executing display processing, which is divided into a plurality of logical layers, in unit of each layer, the display processing performed for each image part constructing animation to be displayed; setting means for setting at least one schedule data for each layer, the schedule data having data which specifies an image part to be displayed, and attribute data which includes display update timing; and control means for controlling processing, set by the setting means and performed by processor means of each layer, in accordance with the schedule data.

Furthermore, another object of the present invention is to provide a sticker printing apparatus, control method thereof, and storage medium, which enable inputting desired character strings, superimposing these character strings, and printing varieties of stickers.

Still further, another object of the present invention is to provide a sticker printing apparatus, control method thereof, and storage medium, which enable desired setting of plural character strings and designs, and which enable easy correction of a necessary portion.

Still further, another object of the present invention is to provide a control method, apparatus and storage medium for quickly starting an application program.

In order to solve the above-described problems and attain the foregoing objects, a sticker printing apparatus according to the present invention has the following configuration.

More specifically, the present invention provides a sticker printing apparatus, including the animation display apparatus according to claim 1, for printing a desired sticker by operating a touch panel overlaid on a display screen, the sticker printing apparatus comprising: input means for inputting a plurality of character strings to be printed on a sticker, in association with a logical layer; storage means for generating bit image data corresponding to an inputted character string and storing the bit image data, each time a character string is inputted by the input means; layout means for superimposingly laying out each of the stored bit image data for each layer; and output means for outputting image data, obtained by the layout means, to printing means.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B show an example of animation image displayed by the embodiment of the present invention;

FIG. 7 is a timing chart of display update processing of animation display;

FIG. 12 shows a construction of senjafuda (to be described later) sticker;

DETAILED DESCRIPTION OF THE PREFERRED EMBODIMENTS

Preferred embodiments of the present invention will now be described in detail in accordance with the accompanying drawings.

<Description of Apparatus Construction>

Figure 1:
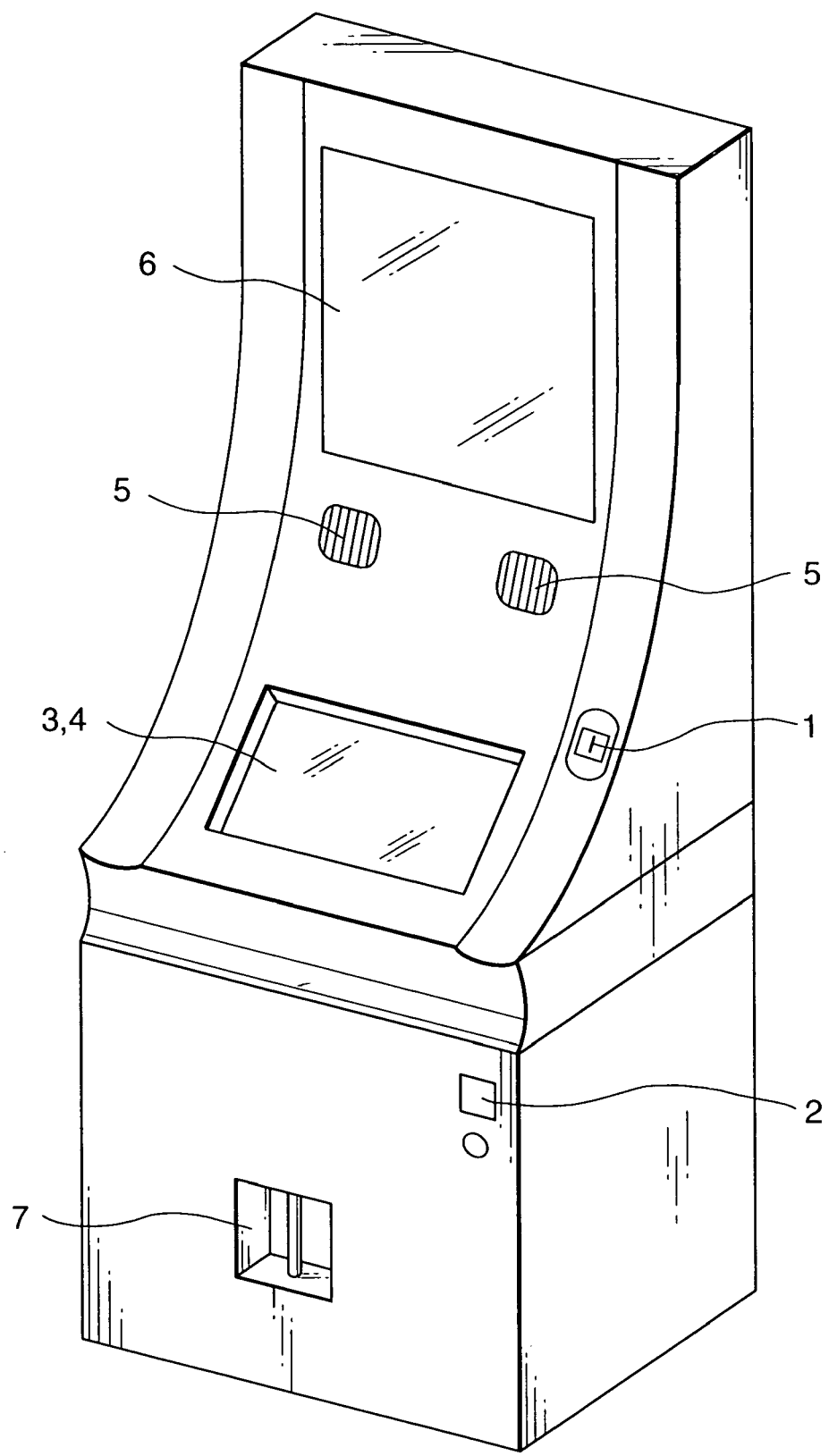
FIG. 1 shows an external appearance of an arcade game machine according to an embodiment of the present invention.

FIG. 1 is a perspective view showing an external appearance of an arcade game machine according to an embodiment of the present invention.

When a predetermined number of coins is inserted to the game machine, a guide is given by screen display or voice. According to the guide, a user selects and inputs a number of characters. The characters and illustrations are combined, and an original sticker in the form of senjafuda is generated and printed. Senjafuda is a Japanese amulet card presented to a shrine to be pasted on the ceiling or pillar of the shrine.

The game machine comprises: a coin shooter for sorting inserted coins, which includes a coin slot 1 and return-coin outlet 2; monitor 3 for displaying a demonstration screen and guide screen; touch panel 4, layered over the monitor 3, to serve as a user input interface; speaker 5 for outputting sound effects or voice; presentation board 6 for explaining the game machine and operation; and outlet 7 for outputting a sticker. The game machine internally comprises a power source, motherboard incorporating a CPU for controlling the entire machine, printer for printing a sticker, lighting for the presentation board or the like, and CD-ROM drive serving as an external storage device.

Figure 2:
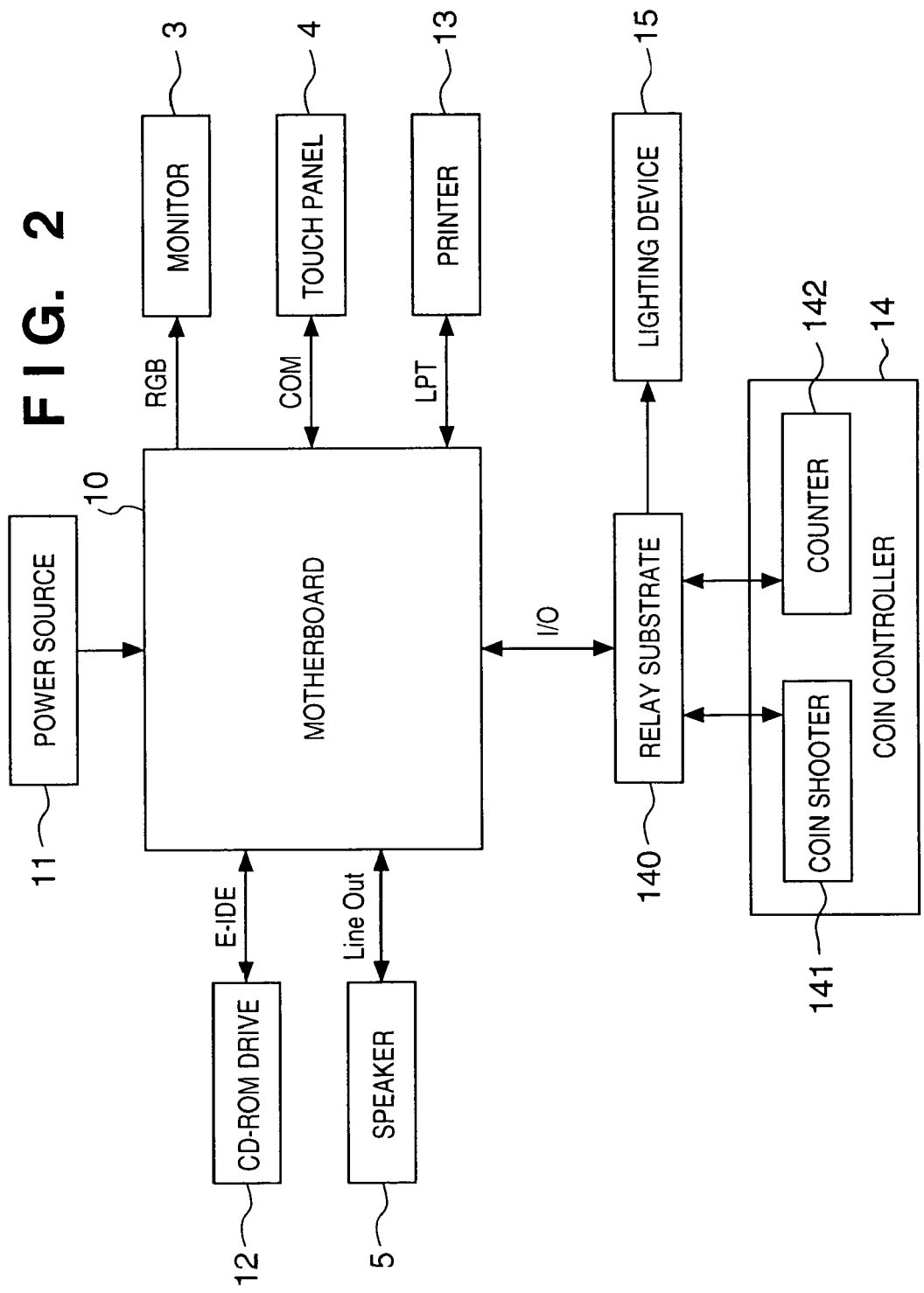
FIG. 2 is a block diagram showing a control structure of the game machine shown in FIG. 1.

FIG. 2 is a block diagram showing a control structure of the game machine shown in FIG. 1.

As shown in FIG. 2, the game machine according to the embodiment of the present invention is constructed such that the entire machine is controlled by a motherboard 10 incorporating a CPU, to which electric power is supplied by a power source 11. A CD-ROM drive 12 is connected to the mother board 10 through an E-IDE (Enhanced Integrated Drive Electronics) port. The monitor 3 is connected to the mother board 10 through an RGB output terminal. The touch panel 4 is connected to the motherboard 10 through a COM interface. A printer 13 is connected to the motherboard 10 through an LPT interface. The speaker 5 is connected to the motherboard 10 through a Line Out interface. A coin controller 14 inclusive of a coin shooter 141 and counter 142, and lighting device 15, such as fluorescent light, are connected to an I/O terminal of the motherboard 10 through a relay substrate 140.

The relay substrate 140 is provided as the need arises for facilitating maintenance. Further, although not described in the embodiment of the present invention, the motherboard 10 comprises a video input terminal for inputting an image picked up by a camera or the like.

Figure 3:
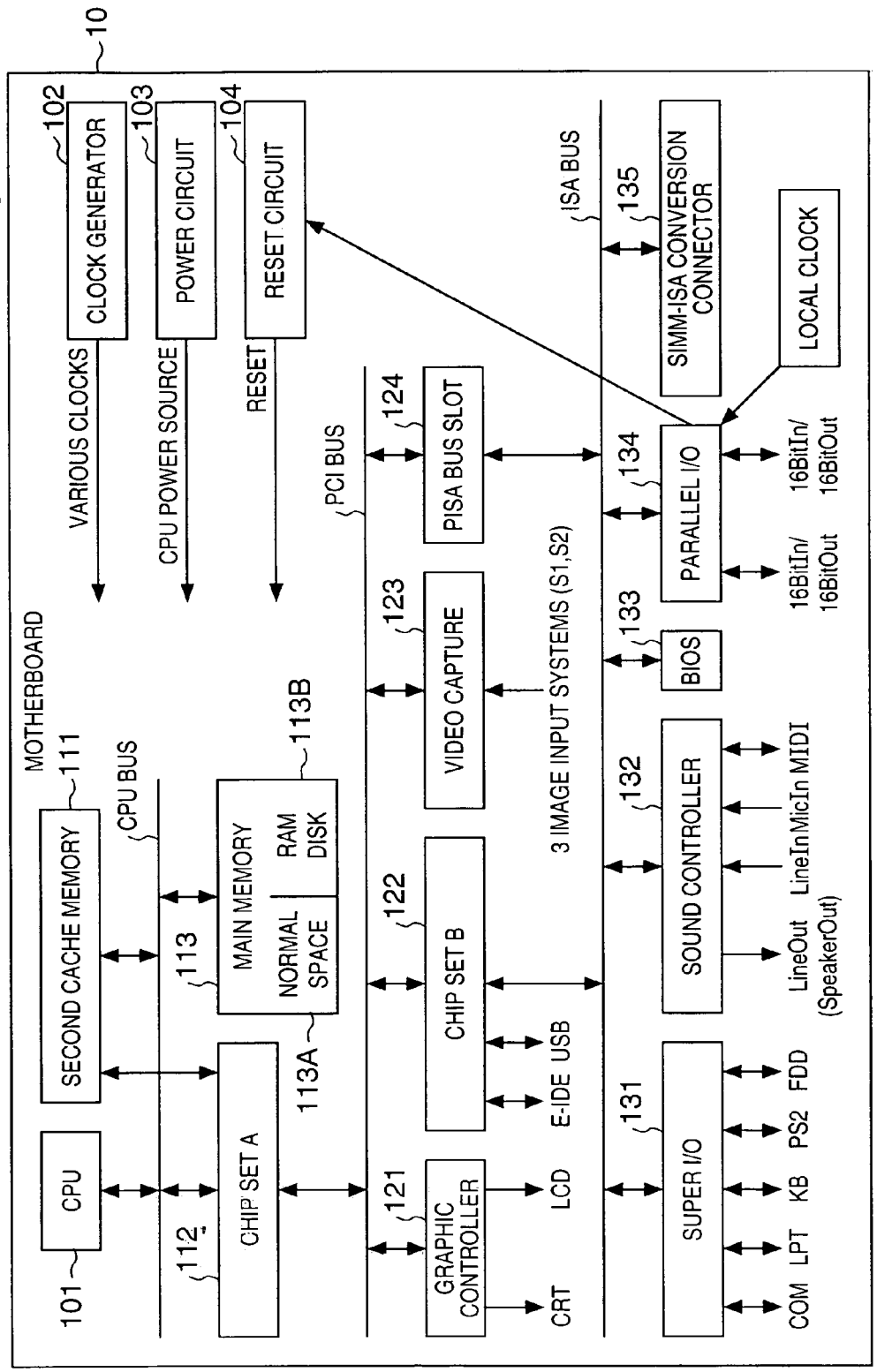
FIG. 3 is a block diagram showing a construction of a motherboard shown in FIG. 2.

Next, the construction of the motherboard 10 is described with reference to FIG. 3.

The main components of the motherboard 10 are: a power circuit 103 connected to the main switch; clock generator 102 for supplying clock signals to each unit; reset circuit 104 for outputting a reset signal; and CPU 101 for controlling the entire machine. To the CPU bus, a secondary cache memory 111, main memory 113, and chip set A 112 for the peripheral LSI are connected. The chip set A 112 includes a memory controller and cache controller, and performs signal conversion between the CPU bus and PCI (Peripheral Component Interconnect) bus.

The main memory 113 is divided into a normal space 113A, where programs (including OS) and execution data are stored, and a RAM disk 113B serving as a virtual disk drive, as will be described later.

The PCI bus is controlled by the chip set A 112 and serves as an external bus directly connected to the CPU 101. Components connected to the PCI bus are: a graphic controller 121; chip set B 122; video capture 123 capturing image data by a camera or the like which is optionally connected; and PISA bus slot 124 commonly used by the PCI bus and ISA bus. The graphic controller 121 comprises VRAM where image display data is stored, and includes an RGB output terminal to be connected to the monitor 3 and an output terminal to be connected to a liquid crystal display. The chip set B 122 serves as a bridge between the PCI bus and ISA (Industry Standard Architecture) bus, controls an E-IDE port and USB port which are connected to an external storage device such as the CD-ROM drive 12, and controls interruption or direct memory access (DMA).

The ISA bus is controlled by the chip set B 122. Components connected to the ISA bus are: a super I/O 131; sound controller 132 having a sound source to be outputted to the speaker 5 and a MIDI interface; basic input output system (BIOS) 133; parallel I/O 134 connected to the coin controller 14 and lighting device 15; and SIMM-ISA conversion connector 135 connected to the ISA bus through an SIMM socket. The super I/O 131 has a COM terminal to be connected to the touch panel 4 serving as a coordinate input apparatus, LPT terminal to be connected to the printer 13, and interfaces for a keyboard, mouse, and floppy disk.

As described above, the game machine according to the embodiment of the present invention is constructed based upon the construction of the PC-AT compatible devices developed by IBM. Note that since the CD-ROM drive 12 serves as an external storage device in the game machine, generally used magnetic-recording-type hard disk is not included in the game machine. However, hard disk may be provided to store other data.

<Description of Start-Up Procedure>

Next, start-up processing of the game machine is described with reference to the flowchart in FIG. 4.

When a main switch is turned on in step S41, in step S42, an electric power is supplied to each unit by the power circuit 103, then the clock generator 102 is started for generating clock signals, and a reset signal is inputted from the reset circuit 104 to each unit of the machine. In step S43, the BIOS 133 is started. Since the BIOS 133 is set so as to prioritize the start-up of the CD-ROM drive 12, the CD-ROM drive 12 is first started, and then data is read out of a start-up CD-ROM set in the CD-ROM drive 12 and developed in the main memory 113.

Figure 5:
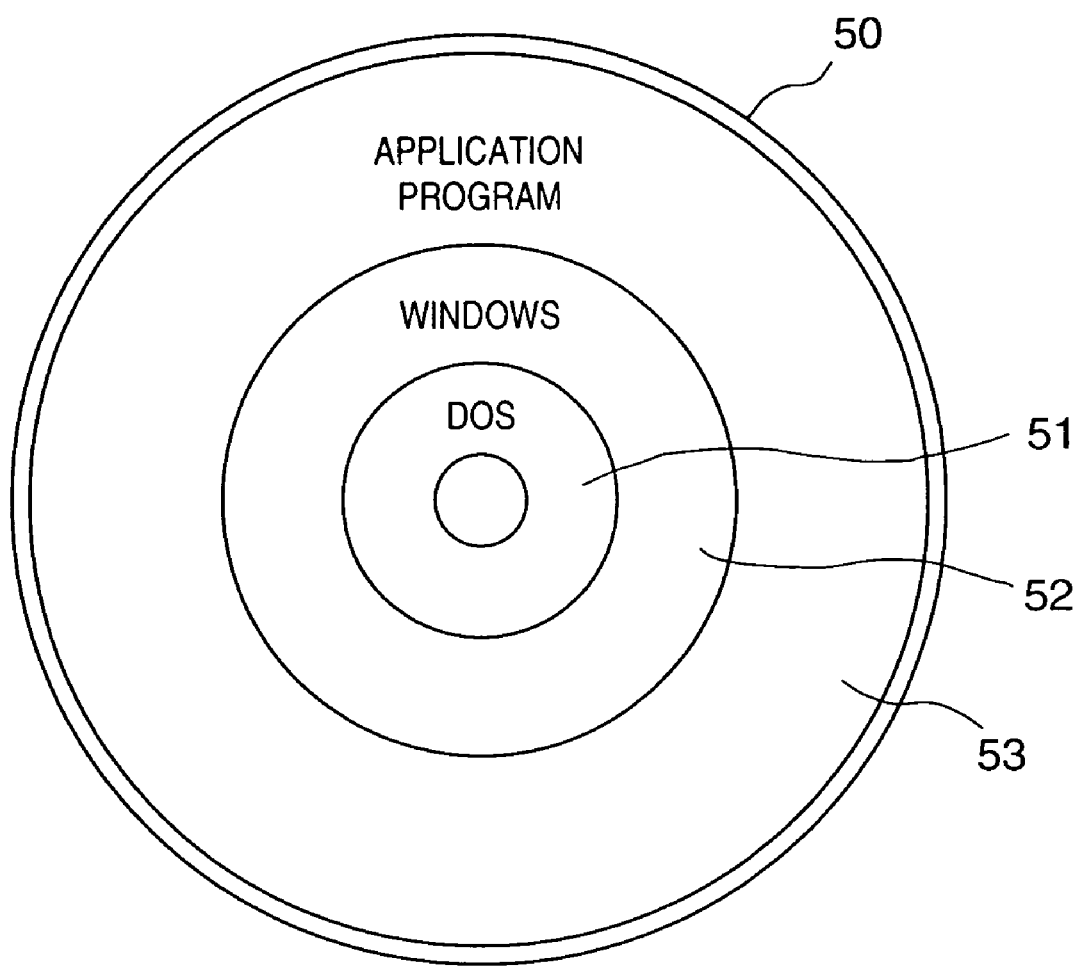
FIG. 5 is an explanatory view of data recorded in a start-up CD-ROM.

FIG. 5 is a conceptual view of data recorded in the start-up CD-ROM. The start-up CD-ROM 50 includes three types of data: data (system file) 51 for a disk operating system (DOS) such as MS-DOS (registered trademark of Microsoft) serving as a primary OS; data 52 for Windows (registered trademark of Microsoft) serving as a secondary OS; and data 53 for an application program of the game machine. Each of these data is compressed and stored in respective areas.

Note that the Windows data 52 recorded in the start-up CD-ROM 50 is not the data for installation which is stored in the generally known set-up disk, but is an executable file-form data generated by installation processing. By having the file-form Windows data 52 necessary for the application program of the game machine, the amount of data recorded in the start-up CD-ROM 50 can be reduced and manufacturing of the start-up CD-ROM can be facilitated. Also, the time lag between the start-up of the machine and start-up of the application program can be reduced.

Figure 4:
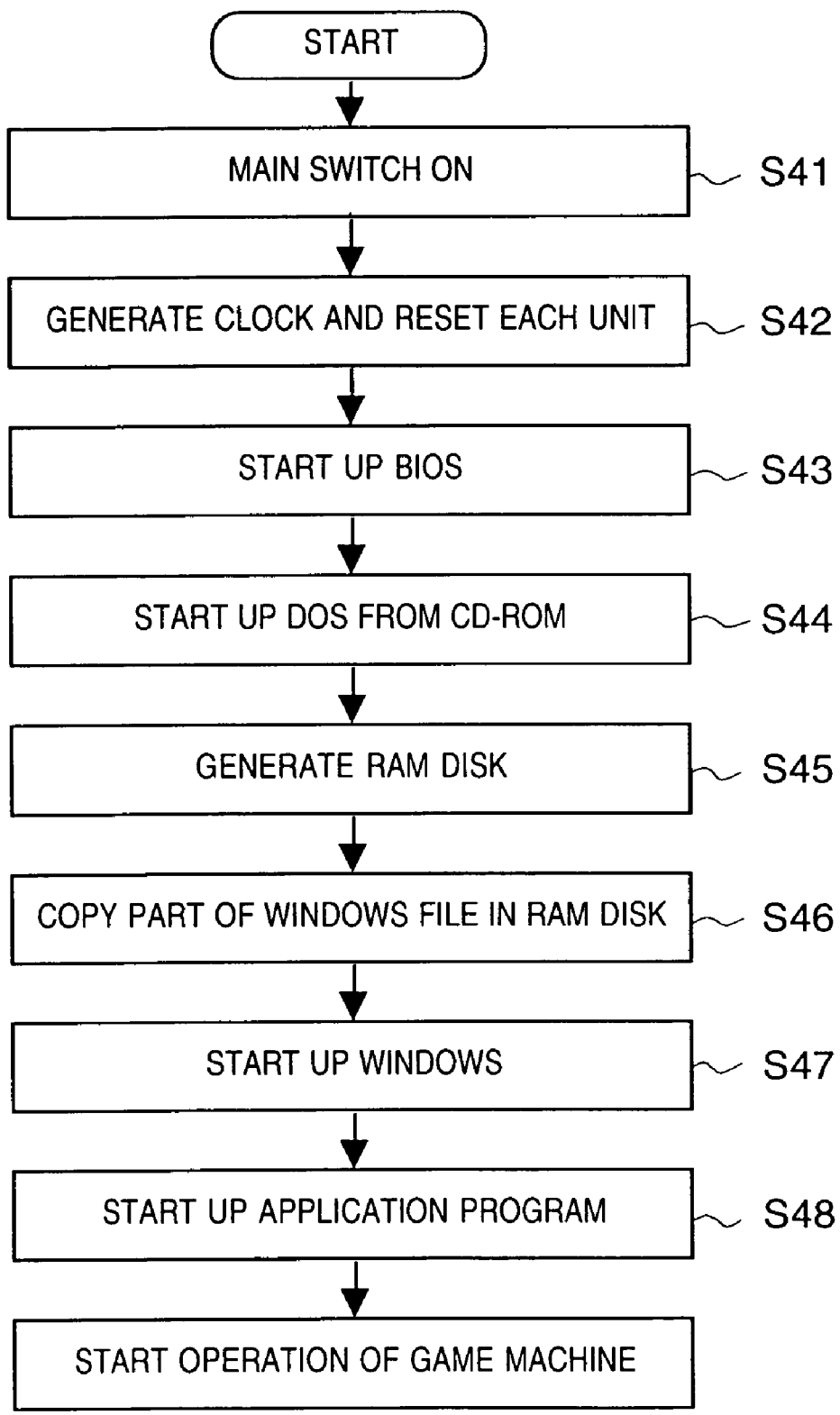
FIG. 4 is a flowchart showing start-up processing of the game machine shown in FIG. 1.

In step S44 in FIG. 4, the system data 51 for DOS serving as the primary OS, which is recorded in the boot area of the CD-ROM, is first read from the start-up CD-ROM 50 to the main memory 113. When the system data 51 is read, MS-DOS is automatically started. In step S45, the MS-DOS generates the RAM disk 113B which serves as a virtual disk drive in the main memory 113.

In step S46, a part of Windows, serving as the secondary OS, is copied from the start-up CD-ROM 50 to the RAM disk 113B by the DOS. Herein, files to be copied in the RAM disk 113B are files that are rewritten (updated) by the secondary OS during operation of the application program, i.e., swap areas, disk cache, registry files and so forth. In addition, a start-up file (win.comm or the like) necessary for starting the secondary OS (in this case, Windows) is also copied.

According to the game machine of the present embodiment, files that are not rewritten but frequently accessed during operation of the application program, more specifically, a device driver, dynamic link library, font and so on, are also copied in the RAM disk 113B. By virtue of this, the number of times of accessing the CD-ROM during operation of the application program can be reduced. Accordingly, errors caused by mechanical accessing operation of the CD-ROM can be reduced, and the time required for reading data can considerably be reduced.

After files are copied in the RAM disk 113B, the control proceeds to step S47 where the start-up file copied in the RAM disk 113B is executed. Then, Windows serving as the secondary OS is started by using the RAM disk 113B and start-up CD-ROM 50. After Windows is started, in step S48, the data 53 for the application program is read and the application program is started by using the start-up CD-ROM 50, and operation of the game machine begins.

By the above-described processing, files of the application program and Windows are read from the start-up CD-ROM 50 as needed during operation of the game machine. The swap area, disk cache, registry files and so on, which are copied in the RAM disk 113B, are rewritten during the operation of the application program.

To shut off the power of the game machine, the main switch is simply turned off. Thus, the special procedure required for ordinary computers installing Windows is not necessary. At this stage, the swap area, disk cache, registry files and so on, which are copied in the RAM disk 113B and rewritten during operation of the application program, are deleted without being stored. When the game machine is started the next time, processing according to the above-described flowchart is started with a fresh memory; therefore, the machine can stably be started at any time. Therefore, data generated by a program may be written in the RAM disk 113B.

The game machine can be stably started because, even when Windows is used as an operating system, the game machine does not access a secondary storage having a mechanical access mechanism, e.g., readable/writable magnetic-recording-type hard disk or the like. The game machine is constructed such that, at the time of start-up, data is stably read from read-only memory, i.e., CD-ROM, and files subjected to writing operation are stored in the electrically volatile memory, i.e., RAM disk, generated in the main memory. However, if the magnetic-recording-type hard disk is to be used for reading operation only, hard disk may be provided. In other words, the physical shape of the storage is not an issue here.

According to the above-described game machine of the present embodiment, the following effects are attained.

Since an application program can be developed by using an application programming interface of a generally used OS having an established environment, the time and cost required for developing an application program can considerably be reduced.

The hardware, except particular I/O units which are different for each application program, can be commonly used for all game machines. Accordingly, reliability of the entire game machines can be increased with the reliable common hardware. Moreover, the cost of the hardware can be reduced by mass production.

When a part of an application program is to be corrected or modified, conventionally ROM must be changed. This required an expert maintenance worker. However, in the game machine of the present embodiment, only the start-up CD-ROM needs to be changed (exchanged). This can be done by any personnel of a game center or the like who does not have expertise of personal computers.

Although a general-purpose OS, e.g., Windows, is employed, the game machine can be started or shut down stably by simply turning on/off the main switch.

The game machine according to the embodiment of the present invention employs CD-ROM as a primary storage medium for storing three types of data: primary OS data, secondary OS data, and data for the application program of the game machine. However, as long as these data can be stored and read stably, a primary storage medium other than CD-ROM may be used, for instance, DVD-RAM, ROM or the like may be used. In some cases, hard disk may be used.

Furthermore, in the game machine according to the embodiment of the present invention, files that are rewritten (updated) during operation of the application program are copied in the RAM disk so that writing operation is performed in the RAM disk. However, as long as the CPU can access the secondary storage at high speed, other media or construction may be employed.

Although the above-described embodiment employs Microsoft's MS-DOS as the primary OS and Microsoft's Windows as the secondary OS, the present invention is not limited to this. For instance, UNIX which is a character based user interface (CUI) similar to MS-DOS may be used. As the above-described secondary OS, X Window system (GUI) may be employed. Strictly speaking, X Window does not serve as an OS, but serves as a shell to be used as a UNIX user interface.

In summary, according to the present embodiment, the environment where the application program is operable must have the following characteristic. More specifically, an OS which supports operation of the application program must execute writing operation in a high-speed volatile storage medium, e.g., RAM drive or the like, in accordance with a request from the OS or application program.

<Description of Application Program>

The foregoing description has explained the operation seen from the hardware. Next, the application program (program serving as a sticker printing apparatus) is described.

The processing of the application program is roughly divided into two processes: one is sticker printing processing performed when a coin is inserted, and the other is animation display processing performed during non-operation state, i.e., during a period from sticker output to the next coin insertion.

Animation display processing is first described.

As mentioned above, animation is generally realized by generating images frame by frame and sequentially displaying the frame images. Thus, the generated amount of data is extremely large. Although the latest processors are capable of considerably fast processing and capable of decoding and displaying compressed moving images by using software, such processors are expensive and generation of moving images is time consuming.

The embodiment of the present invention solves such problems. Inventors of the present invention have noticed that animation is a collection of relatively small image parts. In view of this, the inventors have realized animation by independently controlling update timing of displaying each image part (hereinafter, referred to as display update timing).

Hereinafter, the principle and processing are described.

FIGS. 6A and 6B show a part of animation image used in the present embodiment. Shown in FIG. 6A is a shishimai (ritual dancer with a lion's mask) dancing and approaching forward, and shown in FIG. 6B is a shishimai leaving backward.

This image can be roughly divided into the following parts (image parts) that constitute the animation: an image 600 of a torii (shrine archway) on the background, image 601 of the shishimai's leg, image 602 of the shishimai's body, and image 603 of the shishimai's head. Various patterns of these image parts are prepared and stored in the main memory 113. For instance, the head and leg parts (in some cases, body part as well) are prepared for the case of facing forward and backward. In order to express comical movement of the shishimai, plural patterns of the body, head, and leg parts facing one direction are prepared.

To realize animation of the image shown in FIGS. 6A and 6B, the positional relation is defined as follows.

For the purpose of simple description, assume herein that there are two images A and B stored in separate memory areas. When the image A is displayed on top of the image B, i.e., when the images A and B are superimposed and image A is displayed with a higher priority, the positional relation between the images A and B is expressed as "image B<image A".

In the case of FIG. 6A, the following positional relation holds:

background image 600<leg image 601<body image 602<head image 603

In the case of FIG. 6B, the following positional relation holds:

background image 600<head image 603<leg image 601<body image 602

(Note that the relation of the head image 603 and leg image 601 may be reversed in FIG. 6B.)

The embodiment of the present invention manages the less-than signs (<) in layers. In accordance with attribute data set in the image of each layer, reproduction processings of respective layers are performed in parallel (note that reproduction processing includes displaying animation on the screen and playing audio data). The attribute data is stored in the memory 113 in the form of a table.

FIG. 7 is a timing chart of display update processing of each layer for FIG. 6A.

The background image 600 is in the lowest layer, i.e., an image in the bottom of the layers. Display processing of the background image 600 is executed at timing 700, and will not be executed on the layer until a series of animation ends.

Display update processing for the leg, body and body parts on the upper layers is performed by rewriting respective images on the layer at timing 701, 702, . . . , or 703, 704, . . . , or 705, 706 . . . , as shown in FIG. 7 (execution of display update tasks). The display update processing is performed according to the attribute data written respectively for each layer and stored in the main memory 113.

For instance, in the case of the leg image, in order to express various movement of leg, a number of types of leg image files are prepared. Similarly, a number of types of head image files, e.g., a head image with an open mouse and a head image with a closed mouse and so on, are prepared. Note that the number of files prepared is not equal to the number of times of display update processing shown in FIG. 7. By having attribute data described below, various movement of an image can be expressed.

In the case of an image file, attribute data stored as a table in a predetermined area of the main memory includes: duration from the start of one display processing to the start of the next display processing, display coordinate data, image magnification (reduction) rate, and rotational angle. In the case of an audio file, attribute data includes time data only. Attribute data regarding time and coordinates should be self-explanatory in the above description. Attribute data regarding an image magnification rate and rotational angle is briefly described below. In order to show the image in FIG. 6A as if the shishimai is approaching forward from the torii (shrine archway), the image size is gradually changed from small to large. The magnification rate is provided as attribute data to realize this movement. In the image shown in FIG. 6B, the image of shishimai moving away can be similarly realized. The rotational angle is provided as attribute data in order to give variation to the movement. Variation can be given to the movement if a large number of images are prepared. However, by providing a rotational angle to the image (particularly, to the head image), various expression can be realized with a small number of images. Note that the inventors of the present invention have confirmed that sufficient animation effect can be attained with about 1 to 0.5 seconds of minimum display update timing, although this depends upon the processor's performance.

Figure 8:
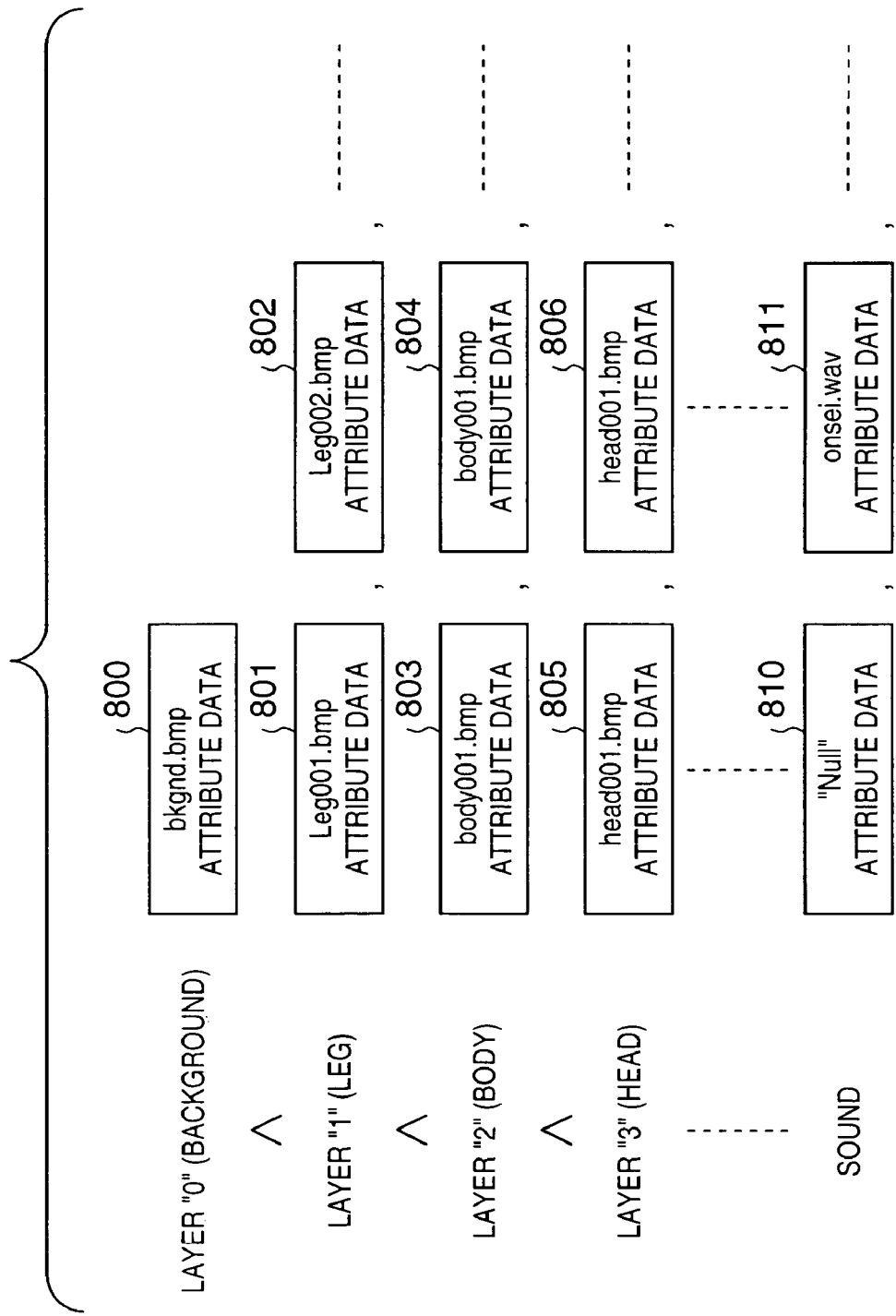
FIG. 8 shows a construction of schedule data for animation processing according to the embodiment of the present invention.

FIG. 8 shows a construction of schedule data in each layer, which realizes the display update timing shown in FIG. 7. The schedule data referred to by reference numerals 800 to 806 are executed respectively at the timing 700 to 706 in FIG. 7. As mentioned above, layers controlled by the embodiment of the present invention are not limited to image files, but audio files are also controlled. Since audio files do not have a concept of one data being on top of the other data, audio files only includes time data indicative of duration from the start of one display processing to the start of the next display processing (data for volume setting or the like may be included in the audio files).

Attribute data may also include data regarding a filter. For filter data, a filter for calculating an average value of a predetermined area (variable size) may be used. Having a filter has the following effect. For instance, by showing the image of shishimai with the head being focused and the body and leg being out of focus, shishimai can be expressed in perspective. The level of focus may be set for each layer.

Note that the schedule data does not always need to have a file name. For instance, assume that execution of an audio file "onsei.wav" is to be started 10 seconds after starting a series of animation. This means that the audio file is not executed for 10 seconds at the beginning. The schedule data 810 in FIG. 8 has a file name "Null" (used as a reserved word) for not executing the audio file, and the attribute data has "10 seconds". This explanation also applies to an image file.

According to the above-described schedule management, processing of each layer is started at the timing indicated by arrows in FIG. 7. In other words, display processing and audio output processing are performed at respective timing, and no particular processing is performed until the next update timing comes. Other processing is performed by the OS.

Note that if the OS does not have a function for displaying an image according to the layers, the application program constructs a synthesized image at a certain timing and displays the synthesized image. The display timing in this case is determined by the display update timing of one of the layers.

Herein, comparison is made with conventional animation reproduction processing. If an image is to be managed by image parts by utilizing the conventional technique, the image parts must be arranged for each display frame, and display processing must be performed frame by frame.

On the contrary, according to the embodiment of the present invention, display images need not be generated frame by frame. Instead, animation display can be realized by deciding a schedule of processing execution timing for each layer. In addition, since the processor's load can be considerably reduced, sufficient quality of animation reproduction can be realized without requiring an expensive high-speed processor.

Hereinafter, schedule data for realizing animation from FIG. 6A to FIG. 6B is described.

FIG. 8 shows the schedule of realizing FIG. 6A. In order to realize FIG. 6B, the attribute data is changed so as to read body image data in the layer 3, head image data in the layer 2, leg image data in the layer 1, and background image data in the layer 0 (images read in the layers 2 and 1 may be reversed).

In other words, instead of assigning a priority order to the image parts to be displayed, an image part to be read is assigned to each of the layers set in advance. By this, animation displaying of the images of FIGS. 6A and 6B can be realized with one schedule.

Figure 9:
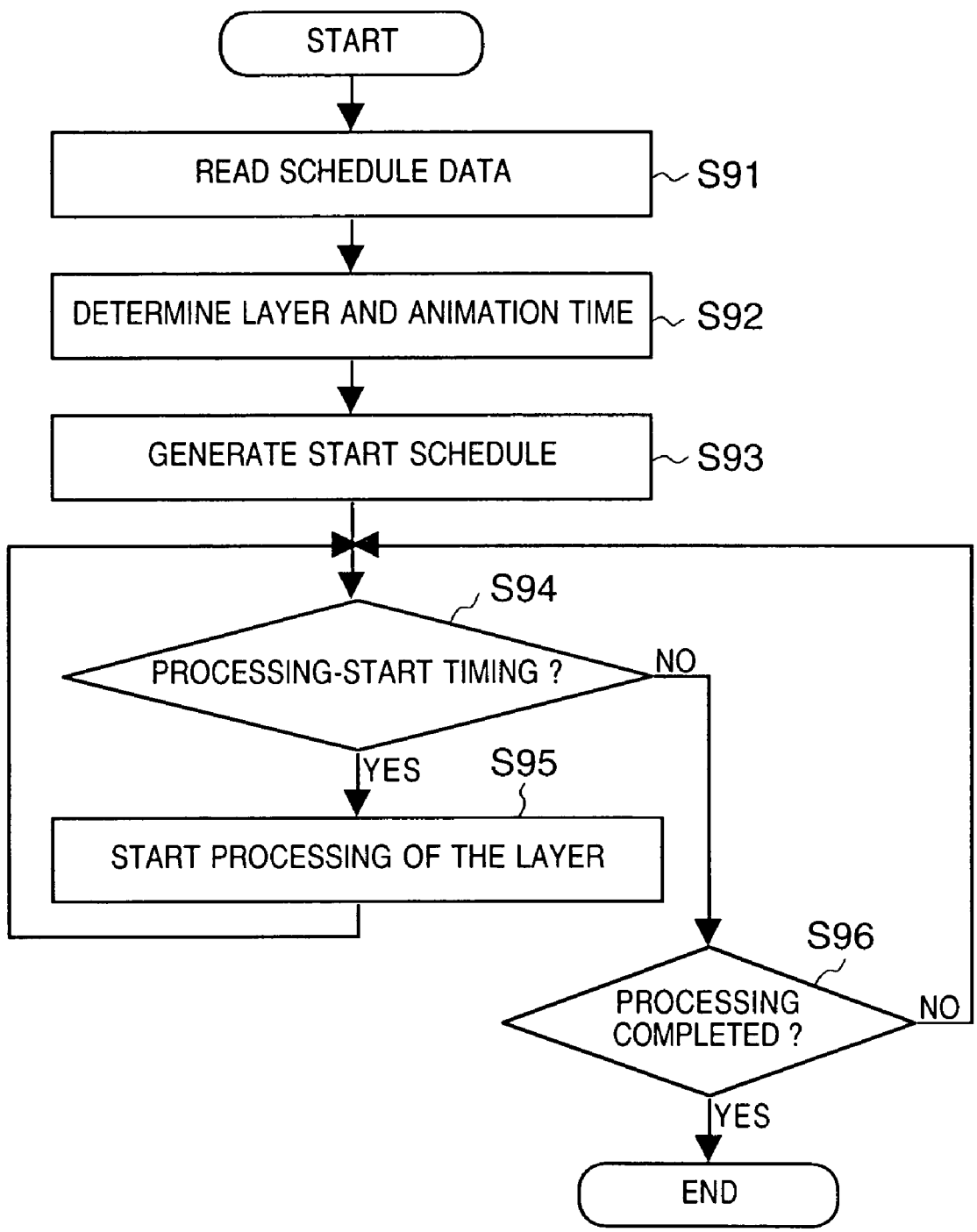
FIG. 9 is a flowchart showing animation processing steps.

Next, processing steps (program processing procedure) of displaying a series of animation are described with reference to the flowchart in FIG. 9.

In step S91, animation data (file having a structure shown in FIG. 8), which has the file name designated by the upper processing, is read in the main memory 113. In step S92, the number of layers to be constructed is determined and animation end time is determined based on the read schedule. In step S93, a processing-start timing schedule for each layer is generated and stored in the memory. For instance, in the case of FIG. 7, in order to execute processing for 700, 701, 703 and 705 at the time of start-up and smoothly execute processing for 702 after the lapse of predetermined time (time set by the attribute data in 801 in FIG. 8), the start-up timing and tasks to be executed are arranged in a proper time sequence. This is due to the fact that the timing schedule is defined as attribute data in the memory.

In step S94, it is determined whether or not any processing-start timing has arrived according to the data generated in step S93. If YES in step S94, the control proceeds to step S95. Then, data required for the tasks (one or plural) to be started is transferred to the VRAM of the graphic controller 121, and the processing is executed. Then, the control returns to step S94. Note that since plural layers cannot be truly simultaneously processed, data is written in the VRAM of the graphic controller 121 from the lower layer first. In the upper layer, an image portion, which overlaps with the image to be written by the upper layer, is saved. However, if the OS is capable of equivalent processing, this processing is not necessary.

Meanwhile, if NO in step S94, the control proceeds to step S96 where it is determined whether or not the processing for the animation data read in step S91 (designated by the upper processing) is completed. If NO in step S96, the control returns to step S94, but if YES, the processing ends.

Hereinafter, the aforementioned upper processing is briefly described.

Animation is not limited to one, but plural types of animation may be provided. In the upper processing, reproduction of plural animation is managed. One animation may be an image of shishimai approaching forward, and the other animation may be an image of shishimai leaving backward. Alternatively, completely different animation may be provided.

Alternatively, one animation may include an image of shishimai approaching forward and then leaving backward. This can be realized easily.

For instance, referring to the schedule data in FIG. 8, assume that head image data (file name and attribute) of shishimai leaving backward is set in the layer 1, leg image data in the layer 2, and body image data in the layer 3 at a certain timing. At an appropriate timing, a magnification rate of these image parts is reduced. By this, an image of shishimai approaching and exiting can be realized without changing the layer order.

Note that the above description has been given assuming that the image parts, constructing animation, are stored in CD-ROM and the data is read therefrom. However, the image part data may temporarily be copied in the RAM disk as mentioned above. Then, the image data is written for each layer in a predetermined area of the memory 113, and written in the VRAM of the graphic controller 121 according to attribute data.

Figure 10:
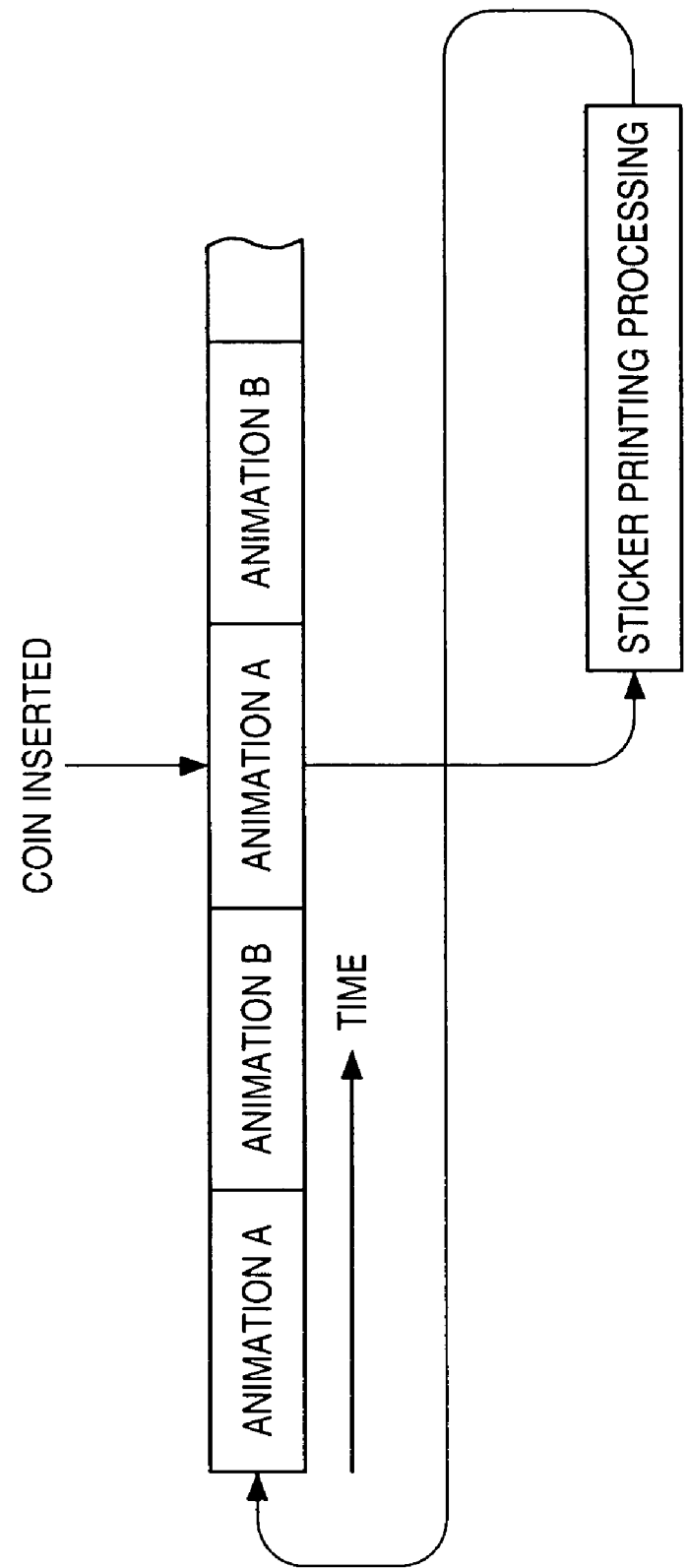
FIG. 10 is a diagram showing operation sequence of the game machine according to the embodiment of the present invention.

As shown in FIG. 10, in a case where plural animation images (animation images A and B in FIG. 10) are repeatedly reproduced (this corresponds to the upper processing in FIG. 9), if a user inserts a predetermined number of coins in the coin slot 1, sticker printing processing is started as shown in FIG. 10.

<Description of Sticker Printing Processing>

Figure 11:
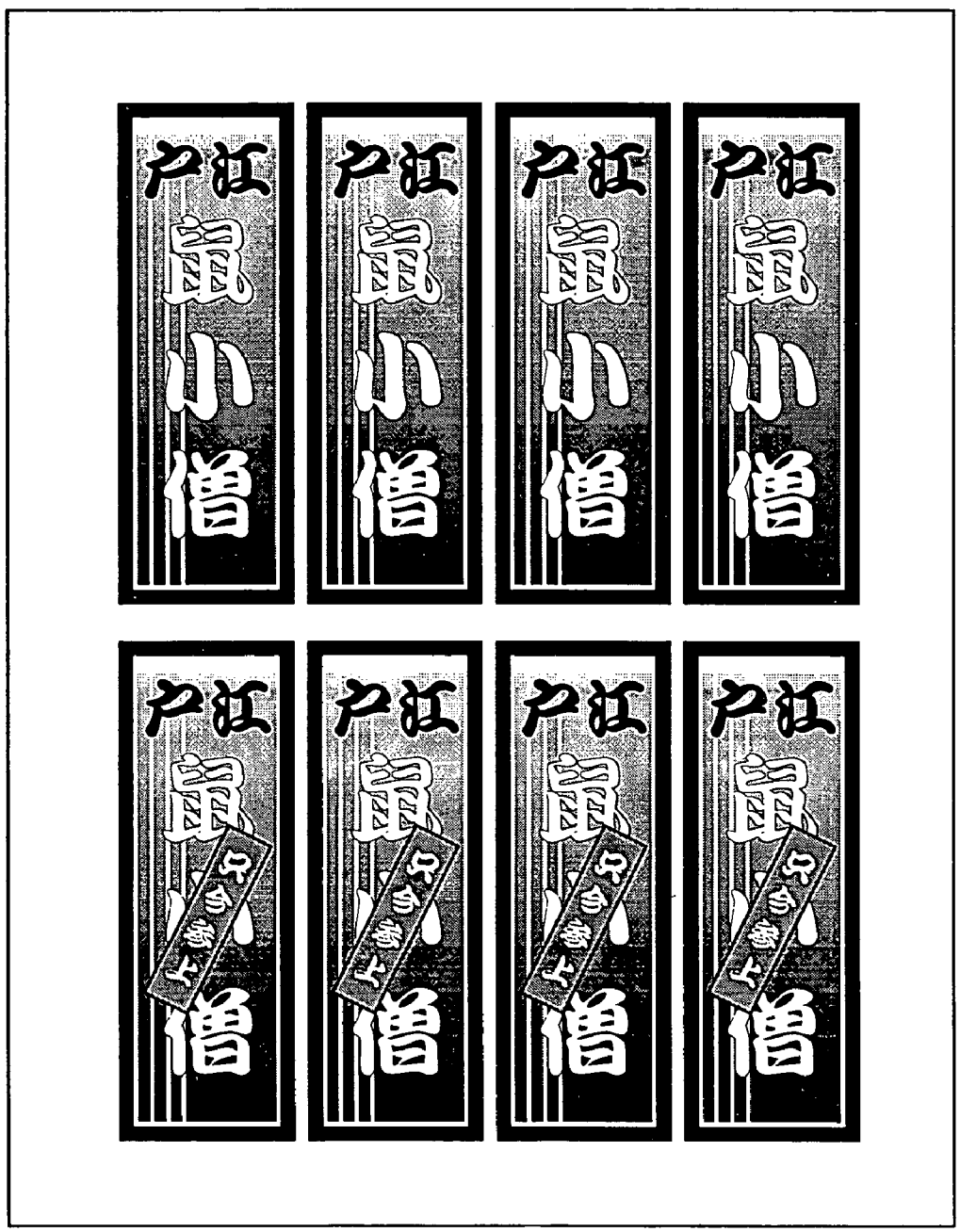
FIG. 11 shows a sheet of stickers printed by the game machine according to the embodiment of the present invention.

A sticker outputted (printed) by the game machine (sticker printing apparatus) according to the embodiment of the present invention has a form of senjafuda (hereinafter referred to as a senjafuda sticker). An example is shown in FIG. 11. A sheet of senjafuda comprises eight pieces of senjafuda stickers, so that a user can peel off the sticker one by one and stick it on a desired object. As shown in FIG. 12, a senjafuda sticker consists of the following image parts.

More specifically, a senjafuda sticker includes: jimon as a background of the sticker, kashira as a header of the sticker, body of the senjafuda, and sashifuda as an insertion. Plural design patterns are prepared for the jimon (background), kashira (header), body, and sashifuda (insertion) and stored in the main memory 113, then displayed in the monitor 3. A user of the game machine selects a desired design pattern by coordinate input on the touch panel 4. Also, plural character strings are prepared for the jimon (background), kashira (header), body, and sashifuda (insertion). The user can either select a desired character string from the prepared character strings, or input desired characters.

A user sequentially sets image parts in the above-described manner, and instructs printing of a sticker. According to the set contents, printing is performed, and a sheet of stickers as shown in FIG. 11 is printed.

Figure 13:
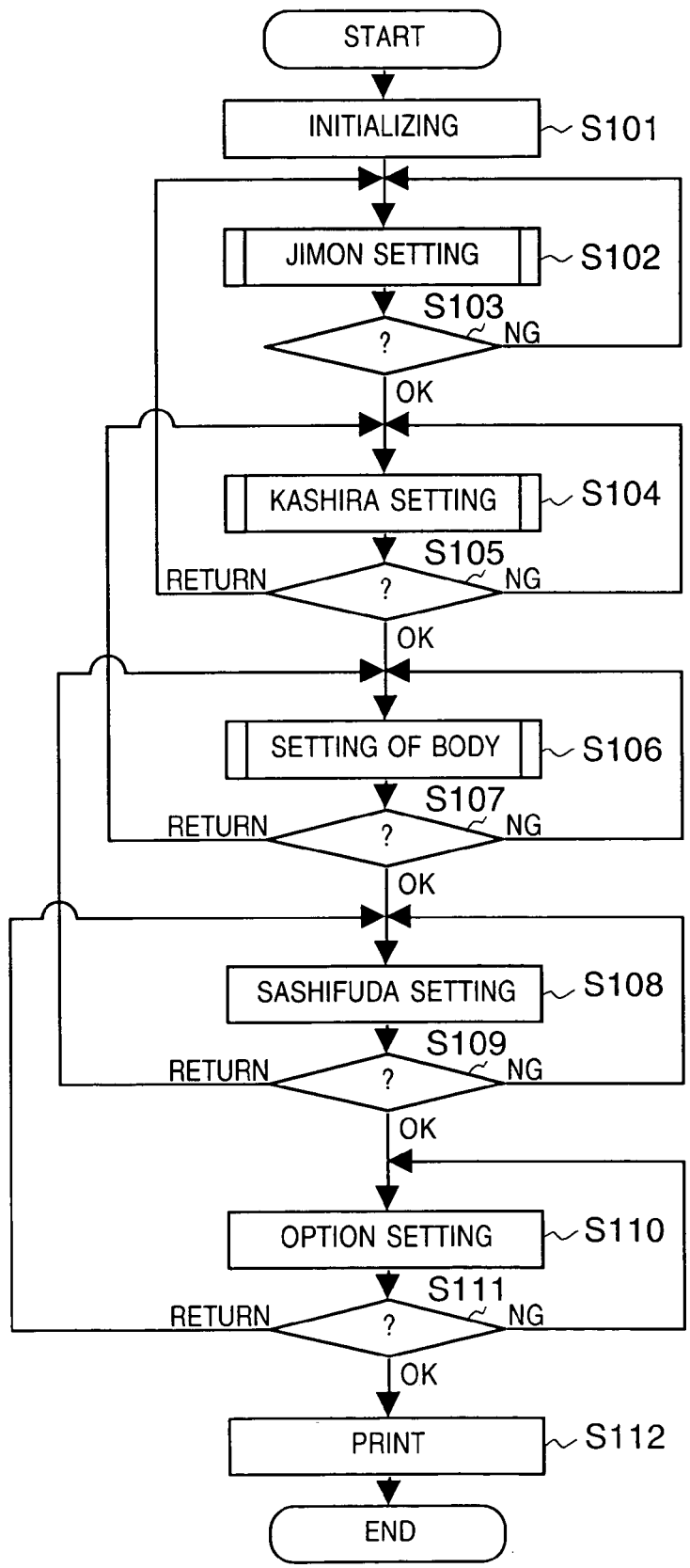
FIG. 13 is a flowchart showing sticker printing processing steps.

Hereinafter, detailed processing steps of sticker printing processing is described with reference to the flowchart in FIG. 13.

Note that in the following description, assume that the jimon (background), kashira (header), body, and sashifuda (insertion) of each image are managed in layers, and have the priority order of jimon<kashira<body<sashifuda.

In step S101, contents of various setting are initialized prior to printing process. The initializing processing includes resetting of variables, which represent setting contents of the jimon, kashira, body, and sashifuda.

In step S102, setting processing for jimon (background) (setting processing for the lowest layer image) is performed. In the jimon setting processing, plural predetermined jimon patterns are written in the VRAM of the graphic controller 121 and displayed on the monitor 3. A desired jimon pattern is selected by the user who designates a coordinate position on the touch panel 4. In this stage, information related to the selected jimon pattern is stored in a predetermined area of the main memory 113 as a variable for jimon, which has been initialized in step S101.

In step S103, it is determined whether or not the setting for jimon is satisfactory to the user by using the touch panel 4. When the user selects to perform setting of the jimon again (NG in step S103), the control returns to step S102 by the CPU. In this stage, the jimon pattern previously selected by the user is temporarily stored as a bit image in the VRAM of the graphic controller 121 and displayed (enabled by the contents of the variable), so as to allow the user easy selection.

When the user designates to perform the next setting (OK in step S103), the control proceeds to step S104 for performing setting of kashira (header) in the main memory 113 (setting processing for the second lowest layer image). In the kashira setting processing, the design and the character string to be incorporated in the design (header "戸𠮷工" in FIG. 11) are set. To select a design (mainly, selection of a character font and color), plural designs are displayed and the user selects one by using the touch panel 4 or inputting a command, as similar to selection of jimon (background). A character string is selected in the similar manner. The user selects one from character strings prepared in advance. Note that a touch area is provided on the display screen so as to enable the user inputting user-original character strings. When the touch area is touched, a keyboard capable of kana-kanji character conversion (unique to Japanese characters) is displayed, allowing the user to input desired character strings in a predetermined area of the memory 113.

The set design and character string are stored in a predetermined area of the main memory 113 as a variable for kashira (header). Therefore, the contents once set can be changed.

In step S105, the control branches in accordance with the designation from the touch panel 4. More specifically, if the user designates to perform setting of kashira again (NG in step S105), the control returns to step S104 for performing the setting processing again. Note that the contents previously set are stored as default data in a predetermined area of the main memory 113. By virtue of this, the user can see the previous setting. In a case where the user has made setting by kana-kanji character conversion and wishes to change the design only but to keep the selected character string, the user does not need to input the character string again, but only needs to depress an OK button.

In the subsequent steps S106 to S109, setting of body and sashifuda (insertion) is performed similarly to the above-described setting operation for kashira.

Similar to the case of setting kashira, contents of previous setting are stored as default data. Therefore, after completing setting processing of each layer, the user can select to perform the setting again. If the user wishes to return to the setting of body after completing the setting of sashifuda (insertion), the user can designate return on the touch panel. Then, the control returns from step S109 to step S106 for performing the setting of body again. Since the contents of previous setting is displayed, the user can change a desired part only, and if no other change is to be made, the user depresses a confirm button such as OK button on the touch panel.

As the setting processing of each layer is performed, an image of the senjafuda sticker constructed up to this point is written in the VRAM of the graphic controller 121 according to the setting contents of each layer, and displayed on a predetermined position of the monitor 3.

After completing setting of the last layer (setting of sashifuda), if the user designates to proceed to the next setting processing, the control proceeds to step S110 for option setting. In the option setting according to the embodiment of the present invention, whether to print/not print the sashifuda (insertion) is set. This option setting is performed because, in some cases, the character string in the body is hidden by the sashifuda (insertion "只今参上") as shown in FIG. 11. If the user designates not to print the sashifuda, the set sashifuda is not printed in all the sticker body. If the user designates to print the sashifuda, half of the stickers (four stickers) is printed with the sashifuda and the other half of the stickers is printed without sashifuda as shown in FIG. 11.

Since the setting processing of jimon (background) has already been mentioned above, hereinafter, the setting processing of kashira (header) (step S104) is described further in detail. With respect to the setting processing of body and sashifuda (steps S106 and S108), detailed description will not be provided because the same processing as that for kashira is performed.

Figure 14:
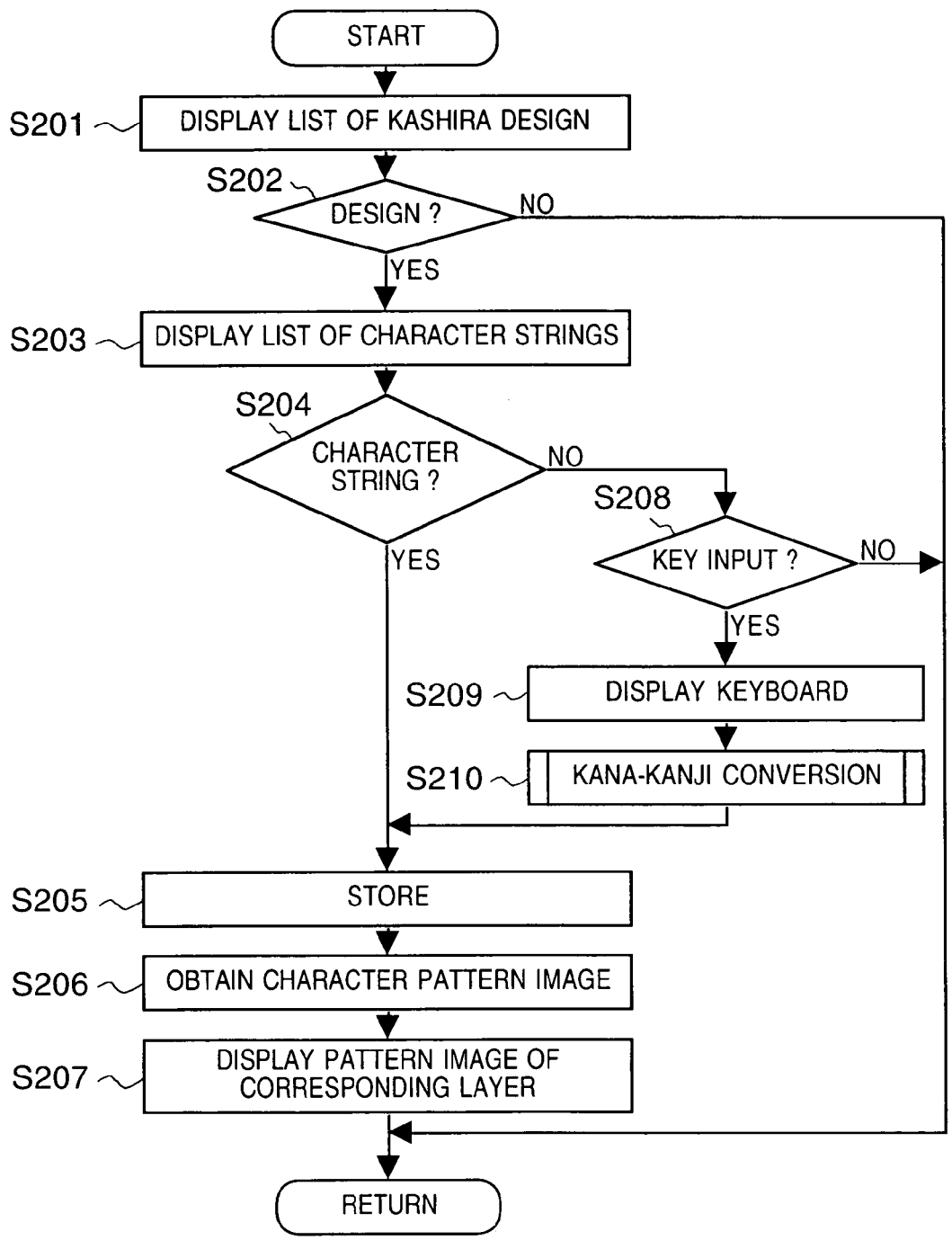
FIG. 14 is a flowchart showing detailed processing of step S104 in FIG. 13.

FIG. 14 is a flowchart showing detailed steps of setting processing of kashira (header) for a senjafuda sticker according to the present embodiment.

In step S201, a list of kashira (header) designs stored in the CD-ROM is displayed on the monitor 3, allowing the user to select one on the display screen. On the monitor 3, an OK button and return button or the like are also displayed along with the designs.

Herein, if the user selects a design and depresses the OK button in step S202, the control proceeds to step S203. In step S203, a list of character strings (character strings prepared in advance) to be used as a kashira (header) is displayed on the monitor 3, allowing the user to select one. On the monitor 3, an OK button, key input instruction button, cancel button and so on are also displayed.

When the user selects a character string from the list displayed on the monitor 3 by coordinate input on the touch panel, the control proceeds to step S205 where data designating the selected design and character string is written as a variable representing kashira (header) and stored. In step S206, a character pattern image is generated with a dot image according to the font data based on the set character string (character code string) and the set design. Then, the generated image data is written as a corresponding layer in a predetermined area of the VRAM of the graphic controller 121, and the dot image is displayed in the predetermined area of the monitor 3. By this, an image of the senjafuda sticker constructed up to this point is displayed for the user. Then, the processing ends.

In step S204, if the user does not select a character string from the list displayed on the monitor 3, the control proceeds to step S208. In step S208, it is determined whether or not the user wishes to input a new user-original character string. If YES in step S208, the displayed list of character strings is erased, and a keyboard is displayed on the monitor 3. By touching a displayed key, kana-kanji character conversion is performed. Kana-kanji character conversion is realized by employing a program included as a standard in Windows. Since a keyboard is not provided physically, a driver program for touch keyboard is prepared to simulate a physical keyboard. Data is transferred from the driver program to the kana-kanji conversion processor. In order to improve operability and achieve user-friendly and accurate kana-kanji character conversion, character conversion is performed word by word.

The above description has been provided for the setting processing of kashira. The setting processing of the body and sashifuda are similarly performed.

As apparent from FIG. 11, the sashifuda (insertion) is not only superimposed upon the character image on the lower layer, but is arranged at an angle. This is realized because, as has been described above, when the design and character string are set, the application program obtains (generates) image data based on the contents of the setting and stores the data independently in the memory, unlike general word processors which let an OS perform the display processing of a character string and design set in each layer. Since image data for each layer is independently stored in the memory, printing the sashifuda at an angle can easily be achieved by rotation processing (rotating sashifuda by a given angle). As a result, stickers with sashifuda shown in FIG. 11 are printed.

Referring back to FIG. 13, if the option setting is OK in step S111, printing processing is performed in step S112.

In general, resolution of a display screen of a game machine is about 75 dpi. Assume that the monitor 3 in the present embodiment has resolution of 75 dpi. The printer 13 in the present embodiment employs an ink-jet type printer applying heat energy, which is capable of printing sufficiently high quality images, e.g., 1400 dpi. In the present embodiment, assume that the printer 13 has a resolution of 600 dpi for each color component.

Assume that the synthesized image of the sheet of stickers, which is generated by the above-described setting operation and displayed on the screen for user's confirmation, has a size twice as large as the actually printing image. The displayed image cannot be printed in such size, because the resultant printed image would have a size of 75×2/600=¼.

In view of this, when printing is performed, a variable which is allocated for each layer in the main memory and contains setting contents is referred, and an image to be printed is generated for each layer in the main memory. For a jimon (background) image, two types of images, one to be displayed and the other to be printed, are already prepared and stored in advance in the CD-ROM. From this CD-ROM, a variable representing the jimon image to be printed is read and stored in the main memory. Then, a print image for kashira (header), which is positioned logically higher than the jimon (background), is generated according to the character code string, font and font size which have been set in the variable for kashira. Then, the generated print image data for kashira is written on top of the print image data for jimon. Next, a print image for body, which is the layer higher than the kashira layer, is generated according to the character code string, font, and font size which have been set in the variable for the body. Then, the generated print image data for body is written to be synthesized with the already-generated image (synthesized image of jimon and kashira). In a case where the user selects not to print sashifuda (insertion) in the option setting, eight stickers of the above synthesized image is printed.

In a case where the user selects to print sashifuda (insertion) in the option setting, the above synthesized image generated so far (synthesized image of jimon, kashira and body) is generated (copied) in another predetermined area of the main memory. Then, a print image for sashifuda, represented by a variable, is generated. The generated print image for sashifuda is rotated by a predetermined angle, and synthesized with the copied image in the main memory. By the above processing, two types of synthesized image data, one with sashifuda and the other without sashifuda, are generated. Based on these image data, four stickers are generated for each image (see FIG. 11).

Note herein that the image for printing is generated only if the user designates to proceed from the option setting. This is because, as apparent from the description of hardware of the game machine of the embodiment, the machine does not have a hard disk for generating a temporary file, and thus the machine must efficiently utilize the limited main memory and RAM disk (disk drive generated logically in the file system). More specifically, if an image for printing is generated in the setting of each layer, a large amount of memory shall be consumed.

The image data ultimately necessary is not the image data for each layer, but is the synthesized image data to be printed. According to the above-described processing of the present embodiment, the memory necessary for the synthesized image data is small, so that data generation can be efficiently performed. Note in a case where the user selects to print sashifuda (insertion) in the option setting, two types of synthesized image data (with sashifuda and without sashifuda) are generated in the above description. However, since the sashifuda image is small, the synthesized image data without sashifuda and image data of sashifuda only may be independently stored in the main memory, and printing may be performed while controlling, in real time, whether to synthesize or not synthesize the sashifuda image. By this, the necessary memory capacity is further reduced.

Note that in the above-described embodiment, the animation display is executed during a period from sticker output to the next coin insertion. However, the animation may be displayed while stickers are being printed, by using an available area of the monitor 3. Alternatively, a machine displaying animation only may be provided.

Furthermore, although the aforementioned embodiment describes printing senjafuda stickers as an example, the present invention is not limited to this.

The present invention is not limited to the aforementioned game machine, but is widely applicable to machines which execute particular applications, e.g., vending machines or industrial machines or the like.

As has been set forth above, according to the present invention, it is possible to realize relatively easy animation display without requiring a special resource, and to easily generate the animation.

Furthermore, a number of user-original character strings can be inputted, and varieties of stickers can be printed by superimposing the inputted character strings.

Still further, not only a number of character strings and designs can be set as desired, but also a part of the already-set characters or designs can be easily corrected.

The present invention is not limited to the above embodiments and various changes and modifications can be made within the spirit and scope of the present invention. Therefore, to apprise the public of the scope of the present invention, the following claims are made.

What is claimed is:

1. A sticker printing apparatus for printing a desired sticker by operating a touch panel overlaid on a display screen, comprising:

storage means which has previously stored a plurality of candidate images for each of parts which forms a sticker, where the parts are each to be overlaid on each other in a fixed order, where at least one of the parts is to be combined with a character string and one of the parts is a background part of the sticker;

parts determination means for determining, in a fixed order, one image for each of parts, by displaying a plurality of candidate images for a part to be determined on the screen and selecting one of displayed plurality of candidate images using the touch panel, and storing into a memory the selected candidate image as a determined part image corresponding to the part;

generating means for, whenever a part image of a part layer is determined by said parts determination means, generating image data of a sticker in an intermediate step performed by said part determination means by laying out part images, having been determined by said parts determination means, stored in the memory in accordance with the fixed order and with predetermined positions assigned to each of the part layers, and displaying the generated image data on a predetermined area on the screen;

edit means for, while said parts determination means and said generating means are operating, selecting a part to be edited in accordance with whether a user designates a previous part or a next part, and editing the selected part so as to re-select one of the plurality of candidate images of the selected part, where a plurality of parts are subjected to be edited; and output means for, when an output instruction is inputted by using the touch panel, outputting the image data of the sticker, obtained by said generating means, to printing means, wherein said parts determination means includes:

discrimination means for discriminating whether or not a part of interest is to be combined with a character string;

first storing means for, if said discrimination means discriminates that the part of interest is not to be combined with a character string, a selected candidate image as the determined part image for the part of interest into the memory;

input means for, if said discrimination means discriminates that the part of interest is to be combined with a character string, inputting a character string using the touch panel;

combining means for combining the selected candidate image with an image of the character string inputted by said input means; and second storing means for storing the candidate image combined by said combining means as the determined part image for the part of interest into the memory.

2. The sticker printing apparatus according to claim 1, wherein said input means comprises:

means for displaying predetermined sample character strings on the display screen;

means for selecting a character string from the displayed sample character strings by using the touch panel;

means for setting the touch panel as character input means; and means for displaying a virtual keyboard for character input operation when the touch panel is set as character input means.

3. The sticker printing apparatus according to claim 2, wherein said input means comprises means for setting a character design.

4. The sticker printing apparatus according to claim 1, wherein the sticker has a form corresponding to a senjafuda, the form consisting of a header (kashira), a main body, and an insertion portion (sashifuda), and wherein said input means inputs respective character strings for the header (kashira), main body, and insertion portion (sashifuda).

5. The sticker printing apparatus according to claim 4, wherein said printing means prints plural stickers on one sheet.

6. The sticker printing apparatus according to claim 5, further comprising setting means for setting whether or not to insert the insertion portion (sashifuda) into the form, wherein, in a case where the setting means sets to insert the insertion portion (sashifuda) into the form, a part of the stickers in one sheet are printed with the insertion portion (sashifuda) inserted into the form.

7. The sticker printing apparatus according to claim 1, wherein the memory to which the determined part image are stored is managed so that the memory has a plurality of memory layers, and said part determination means, when a part image is determined, stores the determined part image into a corresponding memory layer of the plurality of memory layers of the memory, said apparatus further comprising:

drawing means for selecting a memory layer among the plurality of memory layers at the timing defined in a predetermined schedule information and drawing a part image forming an animation in the selected memory layer in accordance with the predetermined schedule information; and animation display means for displaying an animation by combining the parts stored in the plurality memory layers in accordance with schedule information, wherein the display of the animation is executed at the timing period from that a sticker had been printed to that a user operates for printing another sticker.

8. The sticker apparatus according to claim 7, wherein the plurality of memory layers includes a memory layer for storing audio data and the predetermined schedule information defines the timing of reproducing the audio data, and wherein the animation display means reproduces the audio data during the animation in accordance with the schedule information.

9. A control method of a sticker printing apparatus for printing a desired sticker by operating a touch panel overlaid on a display screen, comprising:
- a storing step of storing, in advance, a plurality of candidate images for each of parts which forms a sticker, where the parts are each to be overlaid on each other in a fixed order, and where at least one of the parts is to be combined with a character string and one of the parts is a background part of the sticker;
- a parts determination step, of determining, in a fixed order, one image for each of parts, by displaying a plurality of candidate images for a part to be determined on the screen and selecting one of displayed the plurality of candidate images using the touch panel, and storing into a memory the selected candidate image as a determined part image corresponding to the part;
- a generating step of, whenever a part image of a part layer is determined in said parts determination step, generating image data of a sticker in an intermediate step of said parts determination step by laying out part images, having been determined in said parts determination step, stored in the memory in accordance with the fixed order and with predetermined positions assigned to each of the part layers, and displaying the generated image data on a predetermined area on the screen;
- an editing step of, during execution of said parts determination step and said generating step, selecting a part to be edited in accordance with whether a user designates a previous part or a next part, and editing the selected part so as to re-select one of the plurality of candidate images of the selected part, where a plurality of parts are subjected to editing; and
- an output step of, when an output instruction is inputted by using the touch panel, outputting the image data of the sticker, obtained in said generating step, to a printing unit, wherein said parts determination step includes:
- discriminating whether or not a part of interest is to be combined with a character string;
- if it is discriminated in said discrimination step that the part of interest is not to be combined with a character string, storing a selected candidate image is stored as the determined part image for the part of interest into a memory;
- if it is discriminated in said discrimination step that the part of interest is to be combined with a character string, inputting a character string using the touch panel;
- combining the selected candidate image with an image of the character string inputted in said inputting step; and
- storing the candidate image combined in said combining step as the determined part image for the part of interest into the memory.

10. A computer-readable medium storing program codes to serve as a sticker printing apparatus, which prints a desired sticker by operating a touch panel overlaid on a display screen, said program codes having functions including:
- storage means which has previously stored a plurality of candidate images for each of parts which forms a sticker, where the parts are each to be overlaid on each other in a fixed order, and where at least one of the parts is to be combined with a character string and one of the parts is a background part of the sticker;
- parts determination means for determining, in a fixed order, one image for each of the parts, by displaying a plurality of candidate images for a part to be determined on the screen and selecting one of displayed candidate images using the touch panel, and storing into a memory the selected candidate image as a determined part image corresponding to the part;
- generating means for, whenever a part image of a part layer is determined by said parts determination means, generating image data of a sticker in an intermediate step performed by said part determination means by laying out part images, determined by said parts determination means, stored in the memory in accordance with the fixed order and with predetermined positions assigned to each of the part layers, and displaying the generated image data on a predetermined area on the screen;
- edit means for, while said parts determination means and said generating means are operating, selecting a part to be edited in accordance with whether a user designates a previous part or a next part, and editing the selected part so as to re-select one of the plurality of candidate images of the selected part, where a plurality of parts are subjected to editing; and
- output means for, when an output instruction is inputted by using the touch panel, outputting the image data of the sticker, obtained by said generating means, to printing means, wherein said parts determination means include:
- discrimination means for discriminating whether or not a part of interest is to be combined with a character string;
- first storing means for, if said discrimination means discriminates that the part of interest is not to be combined with a character string, a selected candidate image as the determined part image for the part of interest into the memory;
- input means for, if said discrimination means discriminates that the part of interest is to be combined with a character string, inputting a character string using the touch panel;
- combining means for combining the selected candidate image with an image of the character string inputted by said input means; and
- second storing means for storing the candidate image combined by said combining means as the determined part image for the part of interest into said memory.

* * * * *